(12) United States Patent
Elend

(10) Patent No.: US 9,032,124 B2
(45) Date of Patent: May 12, 2015

(54) DEFINITION OF WAKEUP BUS MESSAGES FOR PARTIAL NETWORKING

(75) Inventor: Bernd Uwe Gerhard Elend, Hamburg (DE)

(73) Assignee: NXP B.V., Eindhoven (NL)

( * ) Notice: Subject to any disclaimer, the term of this patent is extended or adjusted under 35 U.S.C. 154(b) by 457 days.

(21) Appl. No.: 13/518,139

(22) PCT Filed: Dec. 20, 2010

(86) PCT No.: PCT/IB2010/055955
§ 371 (c)(1),
(2), (4) Date: Jun. 21, 2012

(87) PCT Pub. No.: WO2011/080662
PCT Pub. Date: Jul. 7, 2011

(65) Prior Publication Data
US 2012/0271975 A1    Oct. 25, 2012

(30) Foreign Application Priority Data
Dec. 28, 2009   (EP) .................................. 09180816

(51) Int. Cl.
*H04L 12/40*   (2006.01)
*G06F 1/32*    (2006.01)
(Continued)

(52) U.S. Cl.
CPC ........ *H04L 12/40032* (2013.01); *G06F 1/3209* (2013.01); *H04L 12/12* (2013.01);
(Continued)

(58) Field of Classification Search
CPC . H04L 12/40032; H04L 12/413; H04L 12/12; H04L 12/4135; H04L 12/40039; H04L 2012/40241; H04L 1012/40215; H04L 2012/40273; H04L 12/402; G06F 1/3209; Y02B 30/34
USPC .................... 710/105, 305; 713/310; 375/220
See application file for complete search history.

(56) References Cited

U.S. PATENT DOCUMENTS

| 4,924,463 A | 5/1990 | Thomas et al. |
|---|---|---|
| 7,411,913 B2 | 8/2008 | Birsan et al. |

(Continued)

FOREIGN PATENT DOCUMENTS

| CN | 101010915 A | 8/2007 |
|---|---|---|
| WO | 01/20434 A2 | 3/2001 |
| WO | 2006/003540 A1 | 1/2006 |
| WO | 2011/080677 A1 | 7/2011 |

OTHER PUBLICATIONS

International Search Report for Int'l. Patent Application No. PCT/IB2010/055955 (Apr. 26, 2011) xxx.

*Primary Examiner* — Glenn A Auve

(57) ABSTRACT

A method of encoding a digital bus message information, in particular a wake-up bus message information or configuring data, on a bus system, the method comprising: encoding a predetermined part of digital bus message information bits by means of sub-patterns in a stream of line symbols on at least one bus line, wherein sub-patterns consist of successive dominant and recessive phases, comprised of recessive and dominant line symbols, wherein a recessive phase is comprised of at least two recessive line symbols in order to establish a ratio of successive dominant and recessive phases that corresponds to a value of the predetermined part. A respective digital bus message, particularly for use on a bus system, is to be encoded in accordance with the method.

Further, a bus node for a system bus having a plurality of stations that are coupled together by means of an arrangement of bus lines, comprises decoding circuitry configured for an analysis of sub-patterns in a stream of data on at least one bus line, and analysing circuitry configured to detect encoded digital bus message information, in particular a wake-up bus message information or configuring data, transmitted in a stream of line symbols on the bus system, wherein the digital bus message information is encoded in accordance with the method.

15 Claims, 2 Drawing Sheets

(51) Int. Cl.
*H04L 12/12* (2006.01)
*H04L 12/413* (2006.01)

(52) U.S. Cl.
CPC ...... *H04L12/40039* (2013.01); *H04L 12/4135* (2013.01); *H04L 2012/40215* (2013.01); *H04L 2012/40234* (2013.01); *H04L 2012/40241* (2013.01); *H04L 2012/40273* (2013.01); *Y02B 60/34* (2013.01)

(56) References Cited

U.S. PATENT DOCUMENTS

| | | | |
|---|---|---|---|
| 8,825,935 B2 * | 9/2014 | Elend | 710/305 |
| 2002/0077995 A1 * | 6/2002 | Allison et al. | 707/1 |
| 2008/0162682 A1 * | 7/2008 | Ramachandran et al. | 709/223 |
| 2009/0213915 A1 | 8/2009 | Wagner | |

* cited by examiner

DEFINITION OF WAKEUP BUS MESSAGES FOR PARTIAL NETWORKING

FIELD OF THE INVENTION

The invention relates to a bus system having a plurality of bus nodes that are coupled together by an arrangement of bus lines, each bus node comprising at least a transceiver and a bus protocol controller.

Further, the invention relates to a method of encoding and/or decoding a digital bus message on such a bus system in which the digital message comprises at least one part that is encoded by sub-patterns in the bus signal. More particularly, the invention relates to the definition of wakeup bus messages that result in an improved pattern detection in such a bus system, as well as to particular message patterns adapted for improved detection.

Furthermore, the invention also relates to a bus node for use in such a bus system, in particular such bus node may comprise a transceiver, a bus protocol controller, and a pattern detector for decoding such digital message(s) on such a bus system in which the digital message comprises at least one part that is encoded by sub-patterns in the bus signal.

BACKGROUND OF THE INVENTION

It is known that, by exchanging suitable bus messages, bus nodes such as stations that are part of a partial network, such as bus system, can request each other to change between different states of operation, particularly a sleep (or quiescent mode) and a normal mode. Such systems, which are for example subject to the CAN (controller area network) protocol or the LIN (local interconnect network) protocol, or FlexRay protocol (which is a known next generation vehicular network that is described in publicly-available documents and at the FlexRay Internet website)" are typically employed in motor or automotive vehicles, in which there is a steady need for reduction of the electrical energy consumption. Even when the vehicle is parked and not operating, individual stations have to be woken up at regular intervals or upon irregular events to perform individual functions. As well as it is being possible for a change to be made between the sleep mode and the normal mode, it is also desirable for this change to be able to be made selectively, i.e. for individual stations to be able to be actuated separately.

The controller area network (CAN) or the CAN-bus, as one example for the herein addressed communication networks, is a vehicle communication bus standard designed to allow microcontrollers to communicate with each other within a vehicle. The (bus) protocol controllers connected by the CAN-bus are exchanging typically sensor data, actuator commands, service data and the like.

Further, the CAN protocol is a message based protocol, designed specifically for automotive applications but which may also be used in other areas such as different types of vehicles, industrial automation and medical equipment. The CAN protocol is standardized in ISO 11898-1 (2003).

Each bus node is able to send and receive bus messages, but not simultaneously. A CAN bus message consists primarily of an ID, which may be chosen to identify the bus message-type and/or sender, and up to eight message bytes. The bus message bit sequence is transmitted serially onto the bus, one bit after another, i.e. the signal pattern codes the bus message, e.g. in non-return-to-zero (NRZ) coded manner, and is sensed by all bus nodes.

A CAN bus message never reaches these (bus) protocol controllers at the bus nodes directly. The protocol controllers are always connected via a transceiver to the bus. The transceiver may be integrated into a system basis chip, an ASIC or into the protocol controller device. If the bus is free, any bus node may begin to transmit. If two or more bus nodes begin sending bus messages at the same time, the message with the more dominant ID, e.g. which comprises more leading dominant bits, i.e., bit "0", will overwrite other nodes' less dominant IDs. As a result, only the message with the dominant ID remains on the bus and is received by all bus nodes.

Each bus node requires at least a microcontroller unit (MCU) as host processor, the (bus) protocol controller, and the transceiver, which may be integrated all together in the same unit. However, it will be appreciated that it is also possible to have a separate transceiver unit coupled to a separate MCU, whilst the (bus) protocol controller may be a separate unit or integrated in the transceiver or in the MCU, as well.

The (bus) protocol controller, which may simply be hardware with a synchronous clock, is configured for receiving and sending. In receiving, the (bus) protocol controller stores received bits (one by one) from the bus until an entire bus message is available, which can then be fetched by the MCU, e.g. after the (bus) protocol controller has triggered an interrupt. The MCU decides what received bus messages mean and which messages it wants to transmit itself. Sensors, actuators and control devices can be connected to the MCU. In sending, the MCU transfers a transmit messages into the (bus) protocol controller, which encodes and sends the bits serially via the transceiver onto the bus. In sending, the transceiver converts the digital transmit-bit signal received from the (bus) protocol controller into an analog signal that is sent onto the bus. In receiving, the transceiver adapts signal levels from the bus to levels that the (bus) protocol controller expects and has protective circuitry that protect the (bus) protocol controller.

There is a trend for functionalities in the application layer of the communication protocol, which are normally implemented in software, to be mapped into hardware by improving the hardware. The intention in so doing is to relieve the load on the MCU; in this case, when the bus node is not needed, the entire bus node may be switched off, except for the transceiver to save a significant amount of energy and thus to avoid $CO_2$ as well. Wake-up pattern detection is then used to recognize the point in time when the bus node is needed again.

WO 01/20434 describes a method of reducing current consumption in a CAN host processor in which a large part of the processor is set to a sleep mode and incoming CAN bus messages are analyzed by suitable hardware, and if an appropriate wake-up bus message is identified the processor is woken up. A disadvantage is the fact that, for individual stations to be selectively woken, wake-up bus messages have to be decoded, for which purpose the part of the bus node that is on standby at the relevant point in time has to have an accurate timer mechanism, which consumes energy. It would be particularly desirable if, when a station was in the sleep mode, the transceiver could independently receive and analyze data transmitted on the bus line, particularly to enable it to decide whether its own bus node has to be woken up.

WO2006/003540A1 describes a solution for detecting wake-up bus messages in a CAN system. However, the described bus message detector may still react to many bus messages that have a bit pattern similar to the target bit pattern. This leads still to unwanted wake-up events, which can use power unnecessarily.

A further problem with known wake-up patterns is that the defined wakeup patterns do not allow for addressing different wakeup-groups and there is no definition of IDs and priorities to be used.

It is therefore an object of the invention to provide a more reliable method to detect "wake-up bus messages" in a stream of bus messages. In particular, it is an object to specify a method that enables a bus node or functionality of the bus node, such as a transceiver or a separate unit to independently receive and analyze the data transmitted on the bus. More particular, it is an object to provide an improved wake-up functionality, which result in more reliability in situations where a bus node or a sub-network is to be woken individually by means of a given wake-up bus message.

It is a further object to provide an improved wake-up bus message detector for a bus node. In particular, it is an object to enable the bus node to detect wake-up bus messages even when that part of the bus node that shall detect the wake-up bus message does not have an accurate timer and also does not have any knowledge of the bit rate at which the data is transmitted on the bus.

SUMMARY OF THE INVENTION

In accordance with the invention, at least one object is achieved by means of a method of encoding a digital bus message information, in particular a wake-up bus message information or configuring data, on a bus system, having the features specified in claim 1.

Accordingly, the method comprises: encoding a predetermined part of digital bus message information bits by means of sub-patterns in a stream of line symbols on at least one bus line, wherein sub-patterns consist of successive dominant and recessive phases, comprised of recessive and dominant line symbols, respectively, wherein a recessive phase is comprised of at least two recessive line symbols in order to establish a ratio of successive dominant and recessive phases of the sub-pattern that corresponds to a value of the predetermined part. Thus, the ratio of successive dominant and recessive phases can be detected in a more reliable manner.

In certain embodiments the method may further comprise: representing a dominant or recessive, respectively, bit of the digital bus message information by the length of the dominant phase being longer or shorter, respectively, than that of the succeeding recessive phase.

In a further development, a series of digital relative information may be encoded using consecutive sub-patterns in that the number of line symbols used in each sub-pattern is set with respect to a preceding sub-pattern such that consecutive sub-patterns have preferably equal lengths.

In certain embodiments, in which the digital bus message information comprises at least an identifier field and a data field, the predetermined part of the digital bus message information bits may be set such that the predetermined part covers the data field and at least partly the identifier field and the part between the identifier field and the data field. In case of the method being used in a bus system, optionally, according to the CAN specification, at most 8 bytes of 8 bit data are send in the data field of the bus message. Thus, data length codes greater than decimal 8 may be used for the digital bus message information.

In certain embodiments, in which the digital bus message information comprises at least an identifier field, the predetermined part of the digital bus message information bits may be set to cover the identifier field of the digital bus message information only partly. In a particular embodiment, the first 4 bits of the identifier field are not used and the following two bits are recessive bits.

In some embodiments, in particular in bus systems according to the CAN specification, an identifier field of the digital bus message information may comprise 29 bits.

In certain embodiments the digital bus message is a message in accordance with the controlled area network (CAN) protocol or the local interconnect network (LIN) protocol or FlexRay protocol.

In accordance with the invention, at least one object is achieved by means of a bus wake-up bus message comprising a bit pattern encoded in accordance with the features specified in claim 9.

Accordingly, the digital bus message is encoded in accordance with a method discussed before.

In accordance with the invention, at least one object is achieved by means of a pattern detector for a bus node for a system bus having a plurality of stations that are coupled together by means of an arrangement of bus lines, in accordance with the features specified in claim 10.

Accordingly, the pattern detector comprises: decoding circuitry configured for an analysis of sub-patterns in a stream of line symbols on at least one bus line, and analysing circuitry configured to detect encoded digital bus message information, in particular a wake-up bus message information or configuring data, transmitted in a stream of line symbols on the bus system, wherein the digital bus message information is encoded in accordance with a method as discussed before.

In accordance with the invention, at least one object is achieved by means of a bus node chip comprising at least one such pattern detector, as discussed above, in accordance with the features specified in claims 11.

Accordingly, the bus node chip comprises a microcontroller, and: a transmit pin configured to receive a signal from the microcontroller; a receive pin configured to transmit a signal to the microcontroller; and a bus pin configured to transmit and receive signalling to/from at least one of the bus lines.

In accordance with the invention, at least one object is achieved by means of a system bus having a plurality of stations that are coupled together by means of an arrangement of bus lines, in accordance with the features specified in claims 12.

Accordingly, the bus system comprises a bus node chip as discussed before, a microcontroller, and: a transmit pin configured to receive a signal from the microcontroller; a receive pin configured to transmit a signal to the microcontroller; and a bus pin configured to transmit and receive signalling to/from at least one of the bus lines.

In certain embodiments of the invention, the pattern detector comprises means for decoding, for example a decoder unit, being arranged for or comprising means for analysing, such as an analysing unit, for the non-bit rate-dependent analysis of the digital bus signals.

The means for decoding may comprise an arrangement for measuring and/or comparing the lengths of successive recessive phases and dominant phases in order to identify sub-patterns, which are portions of the stream of bits on the bus.

The sub-patterns may basically be defined by starting with a predefined value, e.g. LOW, and ending with predefined value, e.g. HIGH. Thus, when there is exactly one transition from LOW to HIGH within each sub-pattern, the ratio from LOW to HIGH can be determined and translated into one bit of information. The encoding is typically implemented by causing a dominant or "0" (recessive or "1") bit, in the part that is encoded in a non-bitrate-dependent manner, to be represented by the fact that the length of the dominant phase is longer (or shorter) that that of the succeeding recessive phase.

As a result, the bus node or pattern detector is able to analyze bus signals that are such that the digital bus messages comprise at least one part that is encoded in a non-bitrate-dependent manner, in which the value of a bit in that part of the bus message that is encoded in the non-bitrate-dependent manner is represented by the lengths of successive dominant and recessive phases. Information may be retrieved by determining a series of relative length information of the sub-patterns based on a comparison of the length of the actual sub-pattern to the length of the preceding sub-pattern in the stream of bits on the bus. The relative length information may be classified as either "shorter length", "equal length" or "greater length". If necessary the retrieved (decoded) information can be reduced to one bit information by assigning two types of information to one (i.e. resulting in either "equal or not equal", "longer or not longer" or "shorter or not shorter").

By virtue of the fact that such a pattern detector, which can be integrated into a stand-alone transceiver, a bus protocol controller, or a system basis chip or other ASIC comprises means for non-bit rate-dependent analysis of digital signals, it is advantageously possible for digital signals on the bus system to be analyzed even when the exact bit rate is not known and no precise timer is available.

In particular embodiments, the decoder unit arranged for or comprising means for analysing, such as an analysing unit, for the non-bit rate-dependent analysis of the digital bus signals may comprise a shift register, a wake-up bus message register that contains a pre-stored bit sequence, and means for comparing the bit values stored in the shift register and the wake-up bus message register. The decoder unit arranged for or comprising means for analysing, such as an analysing unit, for the non-bit rate-dependent analysis of the digital bus signals may further comprise means for measuring the relative length of consecutive sub-patterns, such as an applicable timer with a register for storing the last time measured and a comparator for comparing the actual measured time with the stored time. It will be appreciated that the timer does not need to be precise but sufficiently stable over the measuring period, e.g. a RC-oscillator may be used with +/−30% accuracy.

Alternatively, for measuring the lengths of the sub-patterns, two capacitors could for example be charged alternately via a resistor, and then the charges in the two capacitors may be compared.

By detecting of the relative length of subsequent or consecutive bit pattern sequences the amount of unwanted wake-ups can be reduced significantly. Accordingly, a wake-up event may only be initiated, when (a) a predefined series of bus message information bits is detected and (b) a series or sequence of a relative length information bits meets also a predefined series at the same time.

In addition, the sub-patterns used to determine the relative length information can be defined differently; e.g. the sub-patterns whose length are compared could be a series of consecutive bits of the same bit value, i.e. "0"s or "1"s, while the series of opposite bit values in between, in this example, is not of importance.

In this way, it becomes possible for wake-up bus messages transmitted over the bus line to be compared with a predefined bus message information, e.g. a pre-stored bit sequence representing the bus message information, and, if the two bit patterns are the same, thereafter or simultaneously to additionally or optionally compare the simultaneously observed series of relative length information for the sub-patterns with a pre-stored series of relative length information. Then, either the bus node or a predefined part of a network may be woken up and/or, if required, the same mechanism may be applied to a confirmation bus message.

The method for encoding the bus message information to be received by the bus node, i.e. the at least one pattern detector in the bus node, may be based on that fact that the value of a bit in that part of the bus message that may be encoded in a non-bitrate-dependent manner is represented by the lengths of successive dominant and recessive phases in sub-patterns and optionally that a series of relative length information for the sub-patterns, detected in decoding of the bus message information, equals a respectively predefined series.

Accordingly, a bus node or a pattern detector comprising the above technical features is able to decode such bus message information, i.e. bus messages, in a more reliable manner. In particular, the bus node or pattern detector is able to compare bus message signals encoded respectively with a pre-stored bit sequence and the series of relative length information for the sub-patterns, detected in decoding of the bus message information, with a respectively predefined series, if the two are the same, to wake up the bus node, i.e. the part of the bus node, e.g. the microcontroller unit, the bus protocol controller or even the transceiver, that is in the stand by or sleep state.

Preferred embodiments and further developments of the invention are defined in the dependent claims of the independent claims. It shall be understood that the apparatus and the method of the invention have similar and/or identical preferred embodiments and advantages.

BRIEF DESCRIPTION OF THE DRAWINGS

These and other aspects of the invention will be apparent from and elucidated with reference to the embodiment(s) described hereinafter. In the following drawings, the figures are schematically drawn and not true to scale, and identical reference numerals in different figures, if any, may refer to corresponding elements. It will be clear for those skilled in the art that alternative but equivalent embodiments of the invention are possible without deviating from the true inventive concept, and that the scope of the invention is limited by the claims only. In the drawings:

DETAILED DESCRIPTION OF EMBODIMENTS

In the following by way of example the herein disclosed method for encoding particular bus messages and the improved pattern detector are described with respect to a controller area network (CAN). However, it will be appreciated that the invention is not limited to such a network but may be applied to a local interconnect network (LIN) or FlexRay network or the like as well.

Figure 1:
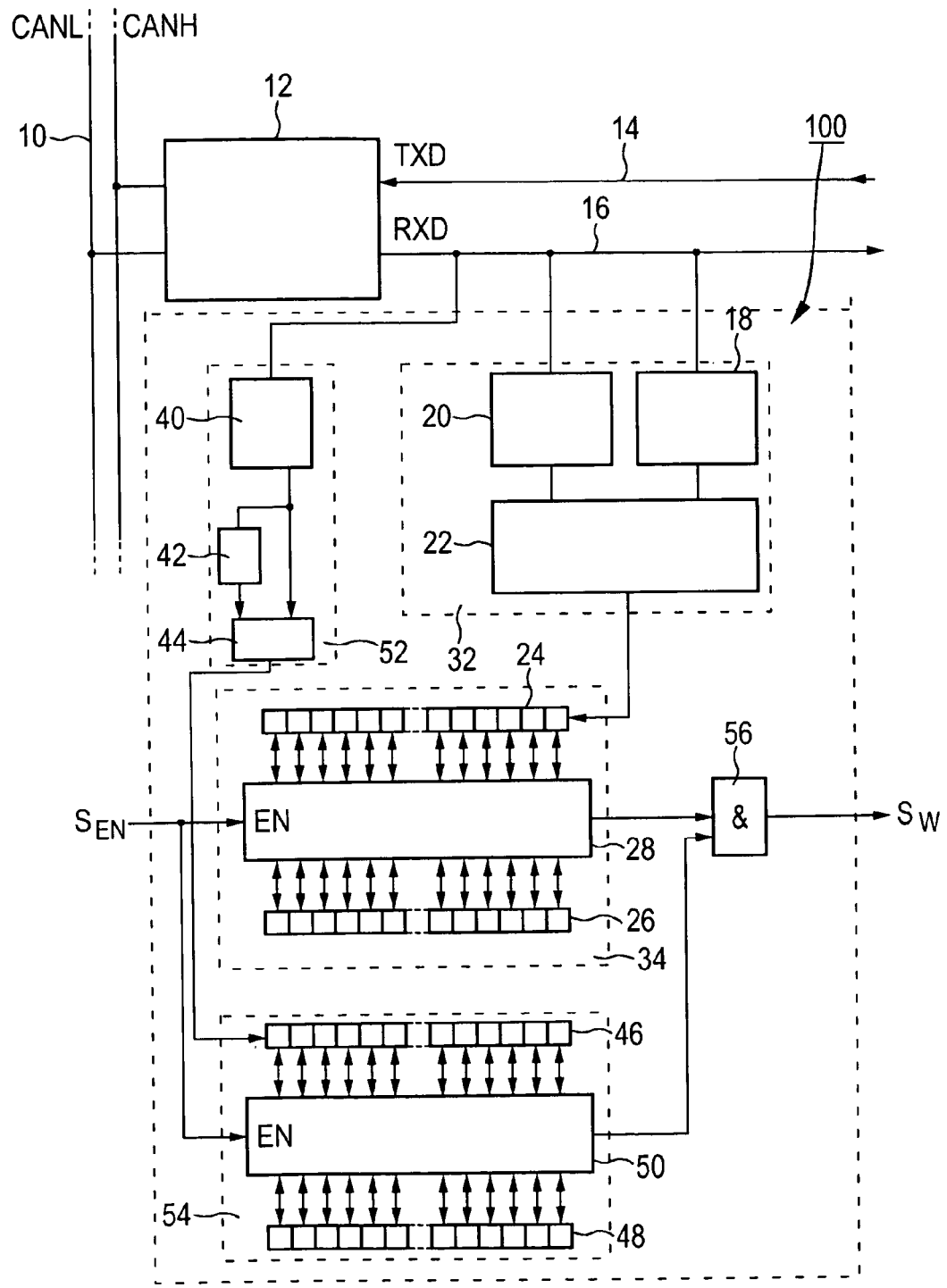
FIG. 1 illustrates a block circuit diagram of a receiver circuit that operates as a selective waking means for the bus node chip.

FIG. 1 shows a transceiver 12 connected to a CAN bus line 10 having CANL and CANH wires and coupled to a pattern detector 100. It is noted that the transceiver 12 and the pattern detector 100 may be combined to one single device or chip and integrated into system basis chips or other suitable configured ASICs. The rest of the bus node is connected to the CAN transceiver 12 by a data transmission (TXD) line 14 and a data reception (RXD) line 16.

A first decoder 32 comprises electronic circuits 18 and 20, connected to the RXD line 16, configured for measuring the length of successive recessive phases ("1" phase) and dominant phases ("0" phase) of bus line symbols, respectively. These two electronic circuits 18 and 20 are called into action alternately.

In the first decoder 32, to measure the lengths of the relevant phases, for example capacitors (not shown) may be employed which are connected to the RXD line 16 via a respective resistor (not shown) and charged via said respective resistor. Connected to the two electronic circuits 18 and 20 is an electronic circuit 22 configured for comparing the lengths of the successive dominant and recessive phases. If the electronic circuits 18 and 20 are implemented by means of capacitors, the electronic circuit 22 could compare the charges in the two capacitors. The electronic circuit 22 may be further configured to emit a recessive/dominant signal as a result when the length of the recessive phase is longer/shorter than the length of the dominant phase. The result is written to a first shift register 24.

Stored in a first pattern register 26 is a bit pattern associated with a wake-up bus message. The bit pattern may be pre-defineable, in particular unique, for the respective bus node or a predefined group of bus nodes in the bus system. A first electronic comparison circuit 28 continuously compares the individual bit values that are present in the first shift register 24 and in the first pattern register 26 containing the stored wake-up bus message. If all the bit values are the same, the wake-up bus message is detected.

Further, to obtain the relative length information from the successive sub-patterns in the digital bus signals, a second decoder 52 is used.

The second decoder 52 can be comprised of, for example, a timer unit 40 having a or being connected to a intermediate storage register 42 for storing the last duration of a sub-pattern measured and a comparator circuit 44 for comparing the actual measured duration of the actual sub-pattern with the one stored in the intermediate storage register 42. The thereby obtained relative length information may simply be coded with two bits, which may encode three possible results, namely representing "shorter length", "equal length" or "greater length". In the second decoder 52 in FIG. 1, the obtained relative length information is reduced to one bit information by configuration of the comparator circuit 44 to assign two types of the fore-going information to one class, i.e. either "equal or not equal", "longer or not longer" or "shorter or not shorter". The timer 40 is further configured to start a new measurement and to move or transfer the actual measured time into the intermediate storage register 42 upon detection of the beginning of a new sub-pattern. It will be appreciated that the timer unit does not need to be precise but sufficiently stable over the respective measuring period, e.g. a RC-oscillator may be used having a sufficient accuracy such as about +/−30%.

Again for implementation of the second decoder 52, instead of a digital timer for the timer unit 40, two capacitors (not shown) may be employed which are connected to the RXD line 16 via a respective resistor (not shown) and charged via said respective resistor. Then for comparing the relative lengths of successive sub-patterns, the comparator unit 44 may be realized by a comparator connected to the capacitors and configured to compare the charges in the two capacitors. The comparator can be further configured to emit as a result, for example, a "1"/"0" when the length of the actual sub-pattern is longer/shorter than the length of the fore-going sub-pattern. The result is again written to a second shift register 46 for storing the sequence of relative length information obtained in the decoding of the successive sub-patterns of a bus message.

Stored in a second pattern register 48 is a predefined sequence of relative length information associated with the wake-up bus message, which may be derived from the pre-stored bit sequence for the corresponding bus message. A second electronic comparison circuit 50 is configured to continuously compare the individual bit values that are present in the second shift register 46 and in the second pattern register 48 containing the predefined sequence of relative length information. If all the bit values are the same, the detected wake-up bus message is validated by the detected relative length information.

The confirmation of the detected wake-up bus message by means of the output of the first comparator 28 and by means of the output of the second comparator 50 is implemented by an AND gate 56, to which the two comparison results are fed and which is configured to combine the two results in accordance with a logical AND-function. The output of the AND gate 56 can be outputted as a wake-up signal $S_w$ which for example can be connected to a respective wake-up pin of the MCU of the bus node.

With the arrangement shown in FIG. 1 it is now easy for an individual bus node comprising the improved pattern detector 100 and being coupled to a bus system, such as a CAN bus or LIN bus or FlexRay, to be woken selectively. For this purpose the bus node that wants to wake another bus node connected to the same bus has to encode the transmitted bus message information by following a particular scheme. It will be appreciated that the invention is not restricted to the particular shown pattern, and that what is important in encoding of the individual bus message information bits is the ratio of the durations of alternating recessive and dominant phases of bus line symbols transmitted on the bus line.

The following table illustrates as one possible example of the herein disclosed solution, a CAN bus message frame format (this message frame format is known to those skilled in the art).

| SOF | Arbitration | Control | DATA | CRC | ACK | EOF |
| --- | --- | --- | --- | --- | --- | --- |
| 1 bit | 11 or 29 bit | 6 bit | 0-64 bit | 16 bit | 2 bit | 1 bit |

Information is passed from transmitters to receivers in a data frame. The data frame is composed of the arbitration field, the control field, the data field, the cyclic redundancy check field, and the acknowledgment field. The frame begins with a "Start of frame" (SOF), and ends with an "End of frame" (EOF). The data field may contain from 0 up to 8 bytes, i.e. 0 to 64 bits. A frame check sequence is derived by means of a Cyclic Redundancy Code (CRC). CAN implements five error detection mechanisms; three at the message level and two at the bit level. At the message level, cyclic redundancy checks, frame checks, acknowledgment error checks are employed. At the bit level, bit monitoring and bit stuffing are used. Additional information may be gathered from the publicly-available CAN Bus Specification; Version 2.0, ISO 11898 or ISO 11519.

By way of example, it is assumed that a sub-pattern is initiated by a leading "HIGH" or "1", i.e. (1), and terminated by a trailing "LOW" or "0", i.e. (0). It is further assumed, by way of example, that a "0" is transmitted as a bus message information bit upon the transmission of any bit sequences comprising more "0"s than "1"s. That is to say, bit sequences of the following form may be employed to mean the transmitted bus message information bit is "0":
- (1)001(0)
- (1)0001(0)
- (1)00011(0), etc.

Similarly, a "1" as bus message information bit to be transmitted may be encoded as follows:
- (1)011(0)
- (1)0111(0)
- (1)00111(0), etc.

Considerably longer sequences are also possible. As mentioned above, for encoding the desired bus message information bit, the ratio between successive dominant and recessive phases is decisive. That is to say, the stream of bits on the bus in sub-patterns, which encode one bus message information bit, are starting with "LOW" or "0" and ending with "HIGH" or "1", or in other words, the bits between the starting and ending bits (1) and (0). Further, within each sub-pattern, i.e. between the leading (1) and ending (0) bits, there is exactly one transition from "LOW" to "HIGH". Accordingly, by definition the ratio from "LOW" to "HIGH" can be determined and translated into one bit the encoded bus message information.

In the following, the part of a wake-up bus message that contains the pattern that the decoder expects is referred to as "the relevant part" in the following description.

According to a first aspect, in order to allow the decoder described in connection with FIG. 1 to detect the ratio of dominant bus line symbols, i.e. "0"s, to recessive bus line symbols, i.e. "1"s, correctly single recessive bus line symbols should be avoided at least for the relevant part of the wakeup bus message, since low slopes at recessive edges and filtering of ringing might suppress a single recessive bus line symbol at the decoder's input. That is to say, e.g. a series such as "...010..." preferably shall not occur in the relevant part (if technology permits, such a series could be used, however). In other words, the part of the wake-up bus message that contains the pattern that the decoder is configured to detect, preferably contains at least two consecutive recessive bus line symbols.

According to a second aspect, in order to decrease the probability of mistaking a non wake-up bus message for a wake-up bus message the relevant part shall not only cover the data field of the message, but also a part of the identifier field and the part between identifier and data field (this is in contrast to the art, where the relevant part would be located completely in the data field). To suit this purpose and follow the requirement according to which the relevant part contains at least two recessive bus line symbols, the CAN controller may make use of data length codes greater than decimal 8, even though the CAN controller (according to the CAN specification) sends at most 8 bytes of data in the data field of the message.

According to a third aspect, the relevant part of the wake-up bus message shall not cover the entire identifier field to allow variation of priority. For example, in order to have the lowest probability of mistaking bus messages the wake-up bus message may be sent with a 29 bit identifier field—even if all other bus messages in that bus system are sent with 11 bit identifiers. Moreover, it may be sufficient to have the first 4 bits of the wake-up bus message to be detected not included in the relevant part, e.g. for selecting the priority of the wake-up bus message. The following two bits shall be set to the recessive bus line symbols, e.g. two "1"s to meet the requirement of the first aspect.

As discussed in connection with FIG. 1, the relevant part of the wake-up bus message to be detected is composed of sub-patterns. According to the three aspects described above, the sub-patterns that preferably shall be used belong either to one of the following groups, i.e. group 1 or group 2.

Accordingly, group 1, in which the dominant phase is longer than the recessive phase in order to encode a bus message information bit, includes the following patterns:
- 00011
- 000011
- 0000111
- 0000011
- 00000111
- 000001111

Further, group 2, in which the recessive phase is longer than the dominant phase in order to encode a bus message information bit, includes the following patterns:
- 011
- 0111
- 01111
- 011111
- 00111
- 001111
- 0011111
- 0001111
- 00011111
- 000011111

Furthermore, the remaining set of possible sub-patterns that may occur in a CAN bus message is assigned to a group 3, which includes the following patterns:
- 01
- 001
- 0001
- 0011
- 00001
- 000111
- 000001
- 00001111
- 0000011111

The sub-patterns of group 3 have a chance to be misinterpreted by the decoder and thus are preferably not used in the relevant part.

In view of the foregoing points, for the relevant part of a wake-up bus message to be detected reliably, sub-patterns of group 1 are preferable and may be used as often as possible.

Moreover, in order to reach the best possible effect of the decoding mechanism implemented in FIG. 1, consecutive sub-patterns shall preferably have equal length and may be used as often as possible.

Figure 2:
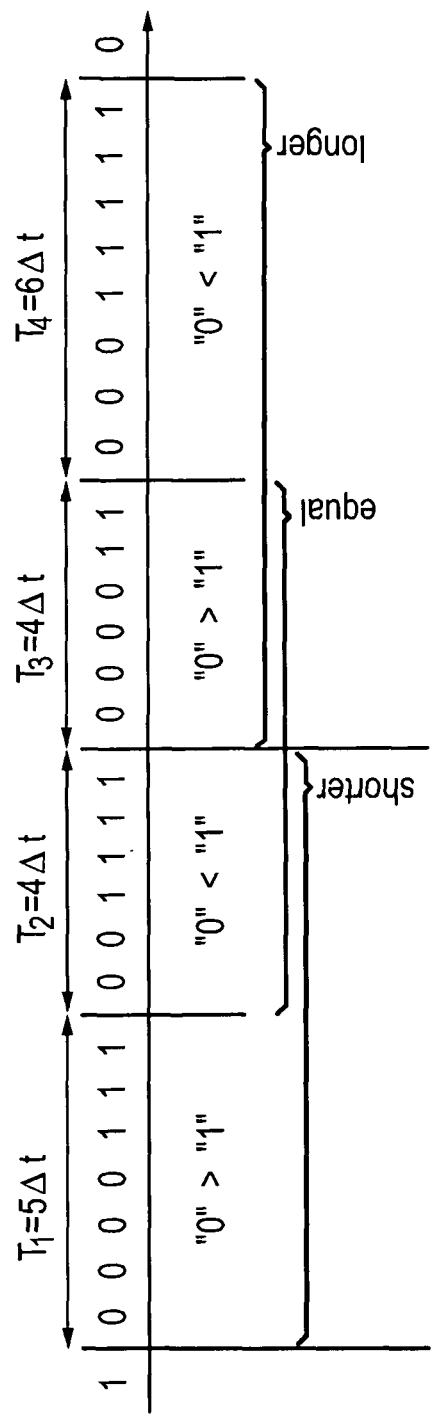
FIG. 2 depicts a layout of signals carrying wake-up bus message information bits and validation information.

Now with respect to FIG. 2, which illustrates the improved wake-up detection mechanism which involves retrieving further information, namely relative length information of consecutive sub-patterns, whereby the probability of unwanted wake-up events can further be reduced significantly.

The first row of "0" and "1" values in FIG. 2 shows the incoming stream of bits on the RXD line 16 of the CAN bus (again, other types of buses also could be used). The second row specifying certain relationships between "0" and "1" values indicates the information retrieved by the decoder unit 32 in FIG. 1. The third row ("longer", "equal" or "shorter") shows the information retrieved by the relative length analyser 52 of FIG. 1.

From left to right in FIG. 2, the sub pattern "001111" having duration T2 is shorter than the preceding sub-pattern "0000111" having duration T1. The sub pattern "000011" having duration T3 has a length equal to the preceding sub-pattern "001111" having duration T2. The sub pattern "00011111" having duration T4 has a greater length than the preceding sub-pattern "000011" having duration T3.

In technical implementations the meaning of "equal" may be that the difference is less the quantization interval. Additionally, for practical reasons or if otherwise desired the detected relative length information can be reduced to one bit information by assigning two types of information to one (i.e. resulting in either "equal or not equal", "longer or not longer" or "shorter or not shorter" relationships amongst the sub-patterns).

In today's partial network wake-up detectors a wake-up is detected, in case a predefined series of information has been decoded, e.g. by a suitable decoder such as the decoder unit 32 in FIG. 1. However, a wide variety of bit streams carries the predefined series of information, leading the existing technology to unwanted false wake-up events.

With the herein proposed detecting of the relative length of subsequent or consecutive bit pattern sequences the amount of unwanted wake-ups can be reduced significantly. Accordingly, a wake-up event may only be initiated, when (a) the first decoder 32 in FIG. 1 detects the predefined series of bus message information bits and (b) the second decoder 52 in FIG. 1 detects the series or sequence of a relative length information bits, i.e. meets also a predefined series at the same time.

In addition, that the sub-patterns used to determine the relative length information can be defined differently; e.g. the sub-patterns whose length are compared could be a series of consecutive bits of the same bit value, i.e. "0"s or "1"s, while the series of opposite bit values in between, in this example, is not of importance.

It will be appreciated that as an option for the electronic comparators circuits 28 and 50 and the first pattern registers 26 and 48 the respective "bit pattern associated with a wake-up message" and the "predefined sequence of relative length information" may comprise one or more "don't care" positions.

It is again noted that although the arrangement shown in FIG. 1 relates to a CAN bus system, the method discussed here and the associated arrangement may equally be used in a LIN (local interconnect network) or FlexRay network. Also, the arrangement in FIG. 1 was used in connection with a wake-up bus message, but is not limited only to that operation. The bus message transmitted to the bus node could however equally well contain configuring data or other commands.

In a further development, if the electronic circuit 56 has detected a wake-up bus message successfully, another timer that is not shown in FIG. 1 may be started. Then, as an alternative way, for a confirmation the just identified wake-up bus message has to be detected within a defined time-span again. Alternatively, a second bus message which is different than the already detected wake-up bus message has to be detected within the predefined time-span. The likelihood of a sequence of dominant and recessive phases that is identical to a wake-up bus message occurring by chance in this case can be reduced as desired by having the first bus message confirmed by at least one further bus messages within a predetermined duration.

Accordingly, the herein disclosed pattern detector in a bus node for the bus system may search for an initial wake-up bus message and a confirming bus message, as well. The digital signals coming from the bus system may additionally be passed through a noise filter (not shown) to the first decoder 32, which is comprised of the electronic circuits 18, 20 and 22, and the second decoder 52 for analysing the relative length of consecutive sub-patterns, which is comprised of electronic circuits 40, 42 and 44 in FIG. 1.

The respective decoded bus message bits are passed on to a first scanner 34 that corresponds to the first intermediate storage register 24 and the second pattern register 26, and the first electronic comparator circuit 28 in FIG. 1. The respective detected relative length information bits are passed on to a second scanner 54 that corresponds to the second intermediate storage register 46 and the second pattern register 48, and the second electronic comparator circuit 50 in FIG. 1.

The first scanner 34 searches for pre-stored bus messages, e.g. a wake-up bus message. For example, when an initial wake-up bus message is received, an additional timer (not shown) is started. The second scanner 54 searches for pre-stored sequences of relative length information for the consecutive received and decoded sub-patterns, which is associated with the pre-stored bus messages.

For example, when an initial wake-up bus message is received, an additional timer (not shown) may be started. If the second, confirming bus message is received within a given window of time, a further positive result is passed on to the AND gate 56 and the remaining part of the bus node is woken up. It is noted that the initial wake-up bus message as well as the confirmation bus message need both to be detected by the first scanner 34 and to be validated by the second scanner 54.

Errors may occur in the first decoder 32 or second decoder 52 as a result of the fact that the dominant and recessive phases measured are equal or that one of the phases exceeds a given measure of time. In this event, a so-called "Decode-Fail" signal can be transmitted to the first and second scanner 34 and 54, which then ignores the data so far received.

The first and second scanners 34 and 54 may also comprise a state machine instead of the respective shift register 24 and 46, respectively that is able to recognize one or more bit sequences.

Furthermore, it will be appreciated that the recessive bus line symbol could be "0"s, and the dominant bus line symbols could be "1", with suitable operational modifications of the system.

The herein disclosed solution is especially applicable in CAN systems, but is not limited to such use. The usage of the disclosed encoding rules for message patterns and the corresponding pattern detector is possible in any CAN or FlexRay transceiver, System Basis Chips and/or respective automotive ASICs, and even in other types of systems.

Finally, it is noted that a bus node can have more than one pattern detector. Then the bus node could be advantageously arranged such that the information stored in the respective first pattern registers (FIG. 1, 26) is different, while the information in the second pattern registers (FIG. 1, 48) is equal, since then the first decoder 32, the second decoder 52 and the second scanner 54 do not need to be provided multiple times in hardware.

Summarizing, a method of encoding a digital bus message information, in particular a wake-up bus message information or configuring data, on a bus system is disclosed. The method comprises: encoding a predetermined part of digital bus message information bits by means of sub-patterns in a stream of line symbols on at least one bus line, wherein sub-patterns consist of successive dominant and recessive phases, comprised of recessive and dominant line symbols, wherein a recessive phase is comprised of at least two recessive line symbols in order to establish a ratio of successive dominant and recessive phases that corresponds to a value of the predetermined part. A respective digital bus message, particularly for use on a bus system, is to be encoded in accordance with the method. A respective digital bus message, particularly for use on a bus system, is to be encoded in accordance with the method. Further, a bus node for a system bus having a plurality of stations that are coupled together by means of an arrangement of bus lines, comprises decoding circuitry configured for an analysis of sub-patterns in a stream of data on at least one bus line, and analysing circuitry configured to detect encoded digital bus message information, in particular a wake-up bus message information or configuring data, transmitted in a stream of line symbols on the bus system, wherein the digital bus message information is encoded in accordance with the method.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single means or other unit may fulfil the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A method of encoding a digital bus message information, the method comprising:
   encoding a predetermined part of digital bus message information bits by sub-patterns in a stream of line symbols on at least one bus line, wherein sub-patterns consist of successive dominant and recessive phases, comprised of recessive and dominant line symbols, respectively,
   wherein a recessive phase is comprised of at least two recessive line symbols in order to establish a ratio of successive dominant and recessive phases of the sub-pattern that corresponds to a value of the predetermined part, wherein consecutive sub-patterns are equal in length.

2. A method as claimed in claim 1, the method further comprising:
   representing a dominant or recessive, respectively, bit of the digital bus message information by the length of the dominant phase being longer or shorter, respectively, than that of the succeeding recessive phase.

3. A method as claimed in claim 1,
   the method further comprising:
   encoding a series of digital relative information by consecutive sub-patterns by a number of line symbols used in each sub-pattern with respect to a preceding sub-pattern, wherein preferably consecutive sub-patterns have equal lengths.

4. A method as claimed in claim 1,
   wherein the digital bus message information comprises at least an identifier field and a data field, and
   the method further comprises:
   determining the predetermined part of the digital bus message information bits to cover the data field and at least partly the identifier field and/or a part between the identifier field and the data field.

5. A method as claimed in claim 1,
   wherein the digital bus message information comprises a data length code field, and
   the method further comprises:
   using of data length codes greater than decimal 8.

6. A method as claimed in claim 1,
   wherein the predetermined part of the digital bus message information bits covers an identifier field of the digital bus message information only partly, wherein the first 4 bits of the identifier field are not used and following two bits are recessive bits.

7. A method as claimed in claim 6,
   wherein an identifier field of the digital bus message information comprises 29 bits.

8. A method as claimed in claim 1,
   wherein the digital bus message is a message in accordance with one of a controller area network protocol, a local interconnect network protocol, and a FlexRay protocol.

9. A digital bus message,
   wherein the digital bus message information is encoded in accordance with a method as claimed in claim 1.

10. A pattern detector for a bus node for a system bus having a plurality of stations that are coupled together by an arrangement of bus lines, the pattern detector comprising:
    decoding circuitry configured for an analysis of sub-patterns in a stream of data on at least one bus line, and
    analysing circuitry configured to detect encoded digital bus message information, transmitted in a stream of line symbols on the bus system, wherein the digital bus message information is encoded in accordance with a method as defined in claim 1.

11. A bus node chip comprising:
    at least one pattern detector according to claim 10,
    a microcontroller:
    a transmit pin configured to receive a signal from the microcontroller;
    a receive pin configured to transmit a signal to the microcontroller; and
    a bus pin configured to transmit and receive signalling on at least one of the bus lines.

12. A bus system having a plurality of stations that are coupled together by an arrangement of bus lines and at least one station having a bus node chip according to claim 11.

13. A method of encoding a digital bus message information, the method comprising:
    encoding a predetermined part of digital bus message information bits by sub-patterns in a stream of line symbols on at least one bus line, wherein sub-patterns consist of successive dominant and recessive phases, comprised of recessive and dominant line symbols, respectively, wherein a recessive phase is comprised of at least two recessive line symbols in order to establish a ratio of successive dominant and recessive phases of the sub-pattern that corresponds to a value of the predetermined part; and
    encoding a series of digital relative information by consecutive sub-patterns by a number of line symbols used in each sub-pattern with respect to a preceding sub-pattern, wherein preferably consecutive sub-patterns have equal lengths.

14. A method of encoding a digital bus message information, the method comprising:
    encoding a predetermined part of digital bus message information bits by sub-patterns in a stream of line symbols on at least one bus line, wherein sub-patterns consist of successive dominant and recessive phases, comprised of recessive and dominant line symbols, respectively, wherein a recessive phase is comprised of at least two recessive line symbols in order to establish a ratio of successive dominant and recessive phases of the sub-pattern that corresponds to a value of the predetermined part, wherein the predetermined part of the digital bus message information bits covers an identifier field of the digital bus message information only partly.

15. The method of claim 14, wherein the first 4 bits of the identifier field are not used and following two bits are recessive bits.

* * * * *